Figure 5:
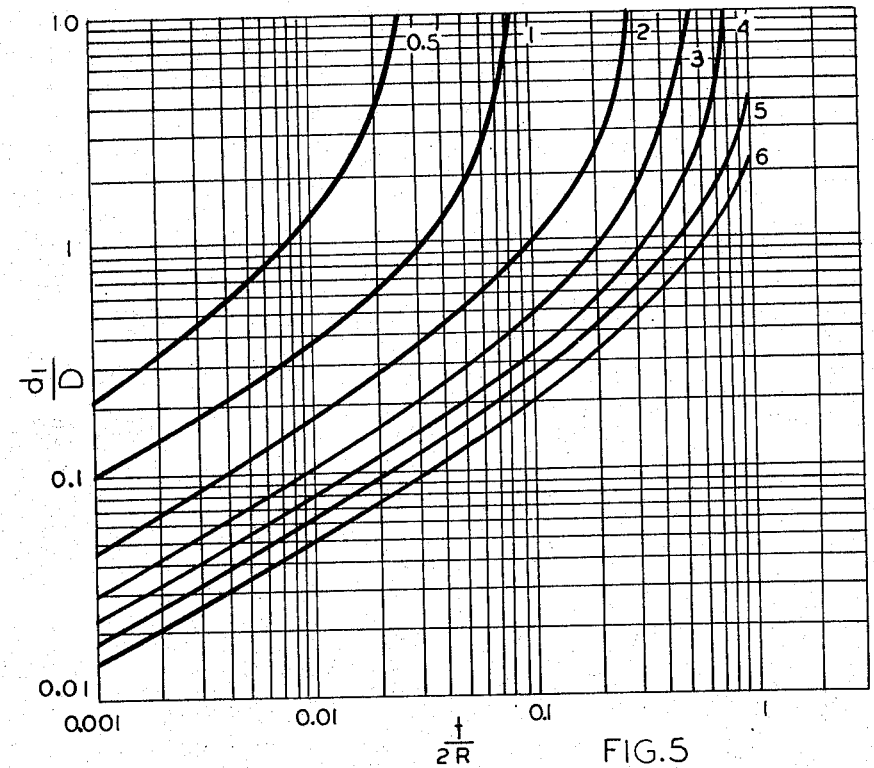

Jan. 17, 1967    R. LE ROY KEEFE, JR    3,298,417
PNEUMATIC TIRE
Filed Dec. 26, 1962    2 Sheets-Sheet 1
FIG. 1
FIG. 3
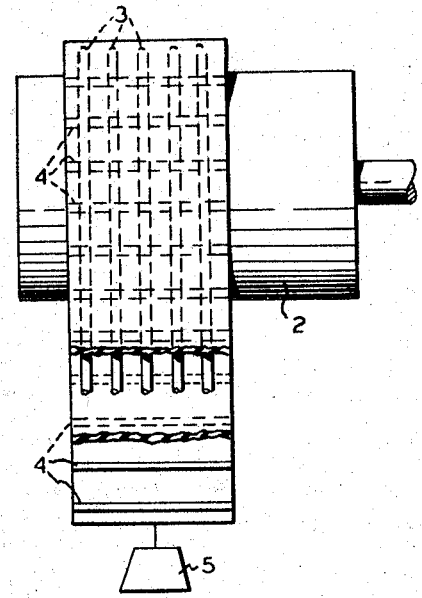
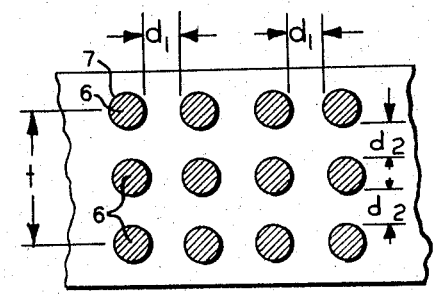
FIG. 2
FIG. 4
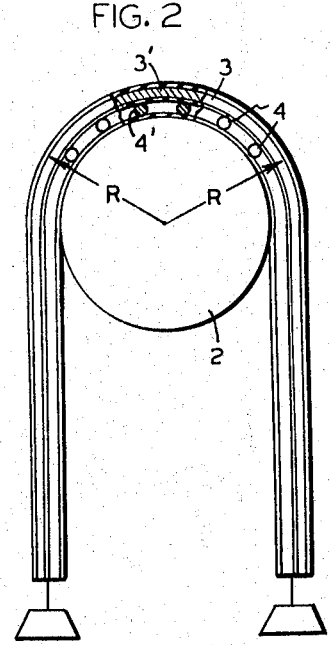
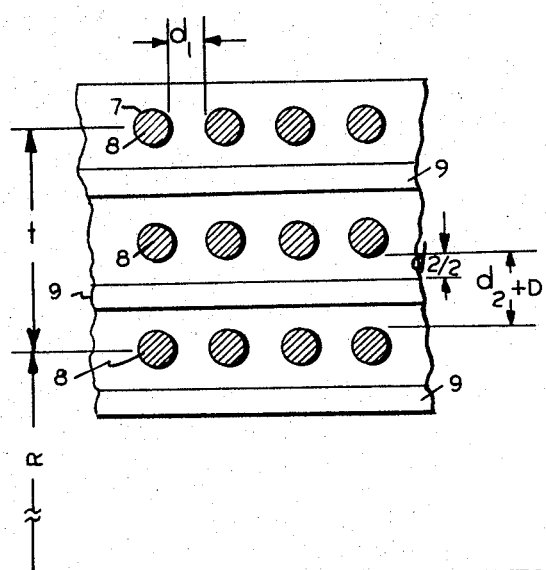
INVENTOR
ROBERT LEROY KEEFE JR.

3,298,417
PNEUMATIC TIRE
Robert Le Roy Keefe, Jr., Chadds Ford, Pa., assignor to E. I. du Pont de Nemours and Company, Wilmington, Del., a corporation of Delaware
Filed Dec. 26, 1962, Ser. No. 247,229
1 Claim. (Cl. 152—330)

This continuation-in-part of copending application Serial No. 858,947, filed December 11, 1959, now abandoned. The invention relates to articles which undergo repeated flexing in service, particularly to articles comprising elastomers reinforced with textile materials, such as pneumatic tires and textile-reinforced belting.

For articles such as pneumatic tires and textile-reinforced belting which must retain their form under continued high loads and impacts, it has been essential to reinforce the elastomer with materials which have high strength and high modulus to restrain distortion. A great variety of materials such as sheets and strips of plastic and metallic materials, coil springs, wire mesh fabrics, and others have been proposed as reinforcement for the elastomers. However, combinations of such material with elastomers cannot withstand the flexing of service conditions. Satisfactory reinforcement has only been obtained with natural or synthetic textile fibers, and in some special cases with metal wires of such fineness that they behave essentially as textile fibers. These materials have a much higher inherent stretching modulus than the elastomer and this sharp difference creates very high shearing forces in the elastomer and in the interface during flexing.

It is probably for this reason that practical success has only been achieved by combining fibers or filaments into mechanical structures which have a much lower modulus than that of the individual fibers, and which may be extended or compressed in length without requiring so great a length change in the individual fibers. Typical of such structures are plied and twisted cords.

These devices, although almost universally resorted to, have serious disadvantages. It is expensive to prepare such structures and difficult to fabricate them into finished articles and to obtain adequate adhesion to the elastomer. More important, on both technical and economic grounds, is the fact that the strength of such structures is much less than the sum of the strengths of the individual fibers or filaments placed in them. Excessive amounts of filamentary material are then used to achieve the required strength which leads to relatively thick structures. Under repeated flexing, thicker structures are subject to higher stress, develop more heat, and dissipate heat more slowly, which leads to higher operating temperatures and more rapid flexing fatigue failure. This effect is accentuated by the fact that it is not possible practically to arrange fibers or filaments in such structures so that each behaves exactly like its neighboring filaments. Consequently, some are more highly stressed than others and, in service, move relative to others causing rubbing and chafing which results in fiber damage.

It is an objective of this invention to provide superior articles subject to repeated flexing in service. A further objective is to provide such articles comprising an elastomeric composition and a filamentary material of relatively high strength. Another objective is to provide such articles wherein the filamentary structure is relatively thin. A still further objective is to provide articles comprising elastomeric compositions and reinforcing filamentary structures which have high tensile strength, a controllable degree of stiffness, and high resistance to flexing fatigue. Other objectives will appear hereinafter.

According to this invention these objectives are achieved by providing superior articles subject to repeated flexing in service, such as pneumatic tires and textile-reinforced belts, such articles reinforced with monofilaments of from about 1 to about 50 mils in diameter so spaced in the elastomer matrix that the ratio $$\frac{\text{distance between adjacent monofilaments in one layer}}{\text{monofilament diameter}}$$

is in the range from 0.05 to 2.0 and so spaced that the ratio $$\frac{\text{distance between adjacent monofilament layers}}{\text{monofilament diameter}}$$

is in the range of 0.25 to 4.0.

Figure 6:
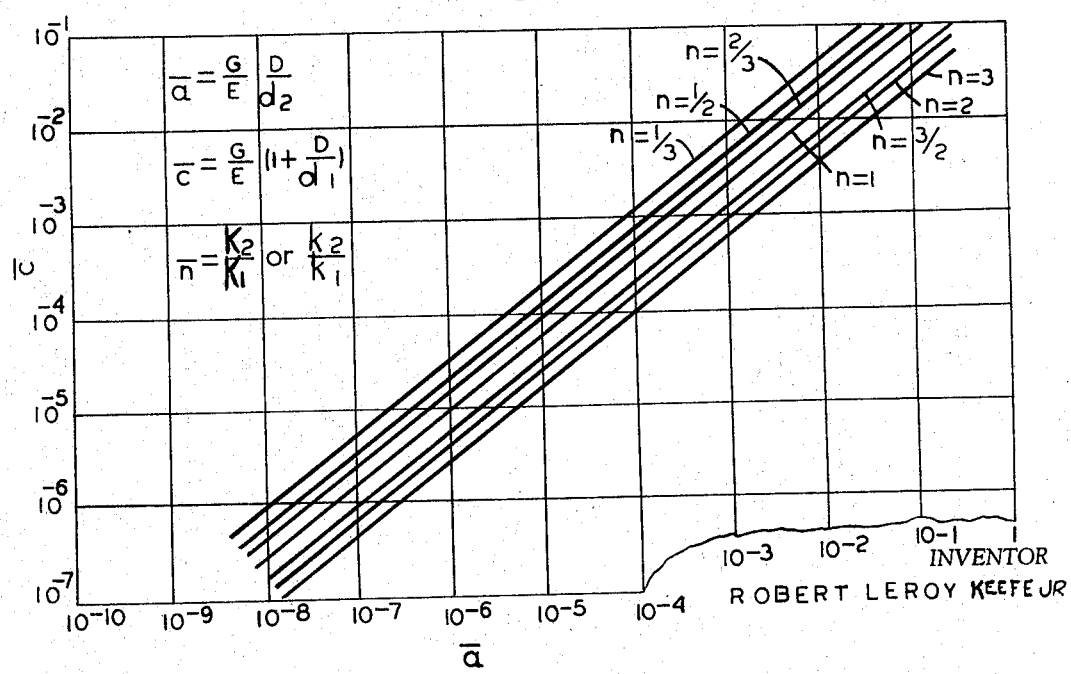

The important factors effective in flexing resistance are (1) Adhesive bond between filaments and elastomer
(2) Shear resistance of the elastomer compound
(3) Stretching modulus of the elastomer compound
(4) Modulus of the filaments
(5) Average filament diameter
(6) Average separation between filaments
(7) The degree of flexing required in service The relationships between these factors are shown in the curves of FIGURES 5 and 6 which are explained in detail below.

It is believed that failure of prior art structures is explained by the following. If a strip of elastomeric material reinforced with a plurality of layers of filamentary material extending generally in the long direction of the strip is bent around a cylinder, there will be within the strip a "neutral axis" layer in which the length of the reinforcing material is unchanged by bending. In all other layers within the strip the length of filamentary elements must change, those in layers toward the outside of the bend being placed in tension and stretched, while those toward the inside of the bend are compressed, each in proportion to its distance from the neutral axis. If the filamentary material is in the form of a twisted cord, it can alter in length with a spiral spring action. However, if it is in the form of untwisted yarn or closely packed filaments, those elements under compression can only shorted by buckling. This action is uncontrolled and uneven, creating large stresses within the elastomer and in the bond between the elastomer and the filament, leading to rapid failure in repeated flexing.

It has now been found that with individual, isolated continuous filaments the buckling which is so destructive in low twist multifilament yarns and closely packed filaments, can be controlled and utilized advantageously to give the effect of a flat spring and thus produce structures which can endure repeated compression without substantial damage to either filamentary or elastomeric components or to the bond between them.

In forming the reinforcing elements for this invention, continuous filaments are arranged in layers one filament thick in an uncured elastomer compound, with proper spacing between filaments, all filaments in the layer being substantially parallel and each filament being completely surrounded by the elastomer compound. Although a single such layer may be used, in general, a plurality of layers are built up to form a sheet of the required strength and thickness. The filaments of the several layers lie in parallel planes. The directions of the filaments in all layers may be parallel or the filament directions in the several layers may be disposed at angles to each other, depending on the directions of reinforcement required in the complete article.

The reinforcing element so formed may then be combined with other materials, shaped or molded to the desired form and cured to produce the finished article. Alternatively, the reinforcing element may be cured in sheet form and subsequently shaped to the desired article.

FIGURE 1 and FIGURE 2 show in diagrammatic form a front view and a side view, respectively, of a reinforced elastomer strip flexed around a pulley 2, and loaded with weights 5. One layer of spaced filaments, 3, with adhesive layer 3', has its filamentary direction parallel to the long direction of the strip and at right angles to both the radius of curvature at any point and to the axis of bending. A second layer of filaments 4, with adhesive layer 4', lies in a parallel plane but has its filamentary direction crossed at 90° to that of filaments 3, and parallel to the axis of bending. Filaments 4, are only slightly affected by the bending and only the filaments 3, which are perpendicular both to the radius of curvature and the axis of bending, are stressed in bending to any considerable degree.

FIGURE 3 shows a highly magnified diagram of one embodiment of this invention comprising three layers of filaments, 6, coated with adhesive layer 7, the filament directions of all layers being parallel, and the space between filaments being completely occupied by the elastomer. For the purpose of describing the spacial requirements of this invention, $d_1$ is defined as the spacing between filaments in a layer, as shown, and is equal to the least thickness of elastomer between filaments in a layer. For the same purpose, $d_2$ is defined as the least thickness of elastomer between two layers which have their filament directions parallel or crossing at a small angle. Since all three layers of FIGURE 3 are parallel, $d_2$ is as shown.

FIGURE 4 shows a highly magnified diagram of another embodiment of this invention comprising six layers of filaments, coated with adhesive layer 7, the filament directions of the alternate layers being crossed at a large angle. As in FIGURE 3, $d_1$ is the least spacing or thickness of elastomer between filaments in one layer. The total spacing between two layers having substantially parallel filament directions, i.e., filaments 8, however, is partially occupied by the crossed layer of filaments 9 and is equal to $d_2+D$ where D is the filament diameter. The least thickness of elastomer between two such substantially parallel layers is in this case divided into two portions, each being equal to the least elastomer thickness between successive plies, and each being equal to $d_2/2$, as shown in FIGURE 4.

In the flexing of the reinforcing elements of this invention shown in FIGURE 3 and FIGURE 4 in such a direction that the filament directions of the layers 6 are perpendicular to both the radius of curvature and to the axis of bending, the filaments which undergo cycles of tension or compression are those lying in the layers 6. The degree of stress on these filaments for any given radius of curvature is proportional to the effective thickness of the structure.

For the purpose of the following description of this invention the effective thickness, $t$, is defined as the center-to-center distance between the innermost and the outermost of those layers having filament directions substantially perpendicular to both the radius of curvature and the axis of bending. This defined spacing is indicated on FIGURE 3 and FIGURE 4.

FIGURE 5 is a curve sheet plotted on logarithmic coordinates showing the relationships between $t/2R$, $d_1/D$, and K or $k_1$ as defined herein. The curves serve two functions. If $t/2R$, D, and K are known and a critical minimum for $d_1$ is to be computed, the curves are lines of constant K. If D, $d_1$, and $t/2R$ are known and actual strain $k_1$ is to be computed, the curves are lines of constant $k_1$.

FIGURE 6 is a curve sheet plotted on logarithmic coordinates showing the relationships between G, E, D, $d_1$, $d_2$ and $n$ as defined herein. The curves serve two functions. If G, E, D, $d_1$ and K are known and a critical minimum value for $d_2$ is to be computed, the curves are lines of constant $n=K_2/K_1$. If D, $d_1$, $d_2$, G, and E are known and the actual strains $k_1$ and $k_2$ are to be computed, the curves are lines of constant $n=k_2/k_1$.

Adhesion

The action of flexing creates stresses both in the elastomer and in the bond between the elastomer and the filaments. To prevent early flex failure, the bond must be sufficiently strong to resist such stress. With most continuous filamentary materials it is necessary to apply an adhesive to the individual filaments before imbedding them in the elastomer. When this is necessary, the adhesive should be applied evenly over the complete filament surface.

Adhesives for the elastomers and filaments, such as dispersions of natural or synthetic elastomers in combination with resorcinol aldehyde resins, or cements of elastomers containing polyisocyanates, which are used generally throughout the art to obtain adhesion of elastomers to twisted cords and to fabrics, have been found to give adequate adhesion in the practice of this invention. Such adhesives may be applied by dipping, spraying, or other known means. The composition of the adhesive and the method of application are not parts of this invention. The basic requirement is that in continued flexing of the finished article, the bond between the filaments and the elastomeric composition shall remain intact throughout the expected service life.

The thickness of the adhesive layer necessary for good adhesion is very small compared with the filament diameter. For example, the application of 5% by weight of adhesive, based on the filament weight, increases the filament diameter by only 2 to 3%. In the computations of this invention the adhesive thickness in such cases may be neglected without causing appreciable error. If for any reason much larger amounts of adhesive are applied, the thickness of the adhesive layer should be considered in the computations. If the adhesive is firm or hard in nature, such as some resin-latex adhesives, the thickness of the adhesive layer should be added to the radius of the filament in determining filament diameter. If the adhesive is elastomeric in nature, such as in elastomer cement adhesives, the thickness of the adhesive layer should be considered a part of the spacing between filaments.

Shear resistance of the elastomers

In the flexing of articles reinforced according to this invention, cyclic shear strains are set up in the elastomer between the filaments in a layer and between the layers. These strains, when repeated many times, cause degradation and ultimate failure of the elastomer. It is well known that the inherent resistance to repeated shear strain of elastomeric compositions varies widely with changes in the basic elastomer, the nature and amounts of compounding ingredients and the degree of cure. This inherent ability to resist repeated shear strain can be estimated and assigned a relative numerical value by the determination of several easily measured properties of the cured elastomer composition and combining the results of these determinations. In preparing elastomer samples for these determinations, the curing conditions used should approximate those giving the optimum cure for the chosen elastomer compound. Conventionally, these conditions run from about one-half to about one hour at 300° F. The tensile strength, elongation and modulus of this elastomer in the test samples should approach those desired in the completed article.

The properties to be measured are:

A = The breaking elongation in percent as measured by A.S.T.M. Standards 1952, Part 6, Test D–412–51T, using die C, and at a rate of 40 in./min.

B = The de Mattia Flex in hours as measured by A.S.T.M. Standards 1955, Part 6, Test D–430–51T, Method B; Bend Flexing, Evaluation of Results—End point is first sign of cracking, i.e., 0.01 in. crack.

C = Tear strength in lbs./in. as measured by A.S.T.M. Standards 1955, Part 6, Test D-624-54, using die C and a rate of 40 in./min.

These three measurements are combined according to the following equation:

$$K = \frac{\sqrt{A \times B \times C}}{606}$$

K, whose value is so determined, is defined as a parameter expressing the degree of shear strain which the elastomer composition can endure in the laminated filamentary structures of this invention. This value usually varies considerably with the particular elastomer chosen. The K values of suitable known elastomers, however, fall within the range of about 0.5 to about 7.0.

The maximum elastomer shear strain allowable, according to this invention, in any reinforcing structure, depends on the position of the elastomer element considered and on the arrangement of the filamentary layers. $K_1$ is defined as the critical maximum shear strain in the elastomer between the parallel filaments of an individual layer. $K_2$ is defined as the critical maximum shear strain in the elastomer between the layers of filaments.

In the case where the filament directions of the several layers are parallel or cross at small angles:

$$K = K_2 = 1.5 K_1$$

In the case where the filament directions of the several layers are crossed at large angles:

$$K = K_1 = 1.5 K_2$$

The critical maximum elastomer shear strains in articles embodying this invention are thus related to the measurable properties of the chosen elastomer composition.

The actual shear strains existing in service within articles embodying this invention will generally be lower than the critical maximum to provide a safety factor against unusual or unanticipated conditions. For the purpose of describing this invention, $k_1$ is defined as the calculated existing shear strain in the elastomer between filaments in a layer, and $k_2$ is defined as the calculated existing shear strain in the elastomer between layers under service conditions. The conditions necessary for a satisfactory service life according to this invention are:

$k_1$ must be less than $K_1$
$k_2$ must be less than $K_2$

Since $k_1$ and $k_2$ may have varying values below $K_1$ and $K_2$ respectively, the ratio between them may also vary. This ratio:

$$n = k_2 / k_1$$

is a useful parameter in describing the relationships of this invention and appears in FIGURE 6. The value of $n$ for the practice of this invention lies within the range of about 0.3 to about 3.0.

Modulus of the elastomeric compound

According to this invention, the desired cooperative reinforcement of filaments and elastomer is achieved in part by a critical relationship between the spacial arrangements, the tension modulus of the filaments, and the tension modulus of the cured elastomer composition. The modulus of the elastomer compound may be determined as the load in lbs./sq. in. necessary for 100% elongation, using A.S.T.M. Standards 1955, Part 6, Test D412—51T, die C, 40 in./min. For the purpose of this invention the parameter G is defined as one-half of the load measured as above. This parameter appears in FIGURE 6. Elastomers having a G value between about 40 and about 400 lbs./sq. in. are operative for the practice of this invention.

Filament modulus

The stretching modulus of the monofilaments, E, represents the force necessary to stretch the monofilament 100% and is determined from the stress-strain curve as measured on a suitable testing machine. An Instron testing machine is preferred. The slope of the early portion of this curve, representing true stretch (corrected for slack) is determined and the force necessary to stretch the monofilament 100% at this slope is calculated as the modulus. For the practice of this invention it is expressed in lbs./sq. in. of cross sectional area. This parameter appears in FIGURE 6. The stretching modulus varies with the particular monofilaments selected for use. For example, most nylon monofilaments have a stretching modulus of at least about 700,000 lbs./sq. in., while monofilaments of other polymers, such as polyethylene terephthalate or viscose rayon, have stretching moduli up to about 1,200,000 and about 1,500,000, respectively. A stretching modulus of at least about 500,000 lbs./sq. in. is required for the practice of this invention.

Average filament diameter

The cross-sectional shape of continuous filaments available for reinforcement, whether of organic or metallic composition are roughly circular or oval in shape. Filaments of viscose rayon and certain other materials are crenulated and present in detail a sharply irregular periphery, but even in these cases the average filament diameter may be determined by measuring the cross-sectional diameter in ten or more random directions and taking an average of such measurements. This average has been found adequate for the practice of this invention and is designated by the symbol D and expressed in mils. Filaments having an average diameter between about one and about 50 mils are operative for this invention.

Separation between filaments

The degree of separation between filaments, in accordance with this invention, is critical because on this spacing depends the strain which is produced in the elastomeric composition during flexing. By the separation of filaments is meant the shortest distance between the peripheries of two adjacent filaments. It is also a measure of the thickness of elastomer composition between the filaments. It will be understood that the greater the separation between filaments, the lower will be the shear strain in the elastomer and the greater the resistance to flexing fatigue of the finished article. The values determined from the curves of FIGURE 5 and FIGURE 6 are the minimum values which can be used to obtain a satisfactory useful service life.

In a reinforcing element made up of a plurality of filament layers, two types of ultimate flexing failure may occur. The elastomer may fail between two layers, resulting in a delamination of the reinforcing element. Such failure is related to the degree of separation between the filaments in one layer and those in an adjacent layer. This spacing is defined as the interlayer spacing and it is designated by the symbol $d_2$. The quantity $d_2$, when determined from FIGURES 5 and 6 using known values for other properties and parameters, is a measure of the critical minimum thickness of elastomer compound between two layers which have their filament directions parallel or diverging at only small angles, below which failure is imminent.

If between such layers there is interposed another layer whose filament direction crosses that of the other two at a large angle, the actual total physical spacing between the two substantially parallel layers must be increased by the filament diameter of the crossing layer and becomes $d_2 + D$, where D is the filament diameter. It is apparent that in this way, the minimum thickness of elastomer compound between filaments in the two substantially parallel plies remains $d_2$.

Failure may also occur in the elastomer between the filaments of a single layer, leading to the formation of cracks in the elastomer parallel to the filaments. The result is a shredding of the layer into groups of filaments.

Such failure is related to the spacing between the filaments in a layer. This spacing is defined as the intra-layer spacing and is designated by the symbol $d_1$. The quantity $d_1$, when determined from FIGURES 5 and 6 using known values for other properties and parameters, is a measure of the critical minimum thickness of elastomer composition which must be placed between two adjacent filaments in a given layer in order to have a useful degree of resistance to flexing in the finished article.

When either of the two types of failure described above starts at any point within the reinforcing element continued flexing causes a rapid spread of the failure and is frequently followed by other types of failure such as adhesion failure and fiber or elastomer degradation, which may be caused by concentration of stress and the development of heat at the point of initial failure. It is necessary to provide appropriate spacings in both directions to avoid either type of failure during a reasonable useful service life.

As shown above, the shear strain in the elastomer between layers and between monofilaments in a layer depend on whether the filament directions in adjacent layers are substantially parallel or crossed. For the purpose of this invention if adjacent layers cross one another at an angle of 10° or less they are considered parallel. If they cross at an angle of 20° or greater they are considered as crossed. If they cross at an angle in the transition region between 10° and 20°, the minimum value for $d_1$ should be calculated as if the layers are parallel, and the minimum value for $d_2$ should be calculated as if the layers are crossed.

In most reinforcing elements the filament layers are distributed more or less uniformly throughout the thickness, although there may be a plurality of sections each containing several layers having the same filament direction adjacent to or between sections having several layers of a different filament direction. In such cases, it is suitable to consider the total interlayer elastomer thickness as distributed equally between the total number of layers in determining $d_2$ without serious error.

In those unusual cases where it is desired to have thick sections containing many layers having the same filament direction adjacent to or interposed between other sections containing many layers with a different filament direction, or if two reinforced sections are separated by a large thickness of elastomer, it is more precise to consider each reinforced section as a separate element with its own $t$ and $R$ (defined hereinafter), in calculating the minimum allowable $d_1$ and $d_2$ spacings.

It will also be understood that in the practice of this invention it is not feasible to have all filaments spaced from their neighbors by exactly the same amounts. The degree of variation will depend on the precision of the method chosen for assembling the filaments in the elastomer; $d_1$ and $d_2$ are, therefore, average values.

Relation between filament diameter and filament spacing

It has been found that a direct relationship exists between the filament diameter D, and the average spacings $d_1$ and $d_2$ required for good resistance to flexing. As the filament diameter is increased or decreased from any chosen value, the spacings $d_1$ and $d_2$ must be also increased or decreased proportionally. It appears that the ratios $d_1/D$ and $d_2/D$ are the governing factors. For this reason the co-ordinates of the curves of FIGURE 5 and FIGURE 6 are expressed in terms of these ratios and their reciprocals.

It will be understood by those skilled in the art that any structure will fail if it is flexed repeatedly for an indefinite period and that it will fail prematurely if subjected to a degree of repeated bending more severe than that for which it is designed. It is therefore necessary to specify the severity of bending which a reinforcing element must undergo in service before selecting the minimum filament spacing which will be required to provide a useful service life under these conditions. The severity of bending and the stress caused by bending is related to the ratio between the thickness of the element to be bent and the change in the radius of curvature caused by bending from the unstressed condition. The effective thickness, $t$, as used herein is defined above and illustrated in FIGURE 3 and FIGURE 4. The change in the radius of curvature, R, is defined by the expression $$\frac{1}{R} = \frac{1}{R_1} - \frac{1}{R_0}$$

where $R_1$ is the radius of curvature of the element in the bent and stressed condition encountered in service and $R_0$ is the radius of curvature of the element in its natural unstressed shape in the finished article. If the element in the unstressed condition has no curvature, $R_0$ is infinite and R is equal to $R_1$.

In many cases it may not be possible to specify at the time of manufacture exactly the degree of bending which will be experienced in service. It is, however, an almost universal practice for manufacturers of articles which undergo flexing in service to specify the conditions of service under which the article may be expected to have a useful life. For example, belt manufacturers specify the minimum pulley diameter permissible with a given belt. Pneumatic tire manufacturers specify the minimum air pressure to be used and the maximum axle loading permitted, which factors determine the curvature reached in service. Such specified limitations may be interpreted by one skilled in the art in terms of an effective change in radius of curvature. In general, the change in radius of curvature in service will be within about 0.2 to about 12 inches. The effective thickness of the reinforcing element is between about 40 and about 1,000 mils.

For convenience the ratio of $t$ to R is expressed in FIGURE 5 as $t/2R$. Typical values of this ratio for pneumatic tires are 0.01 to 0.15 and for conveyor belting are 0.01 to 0.025. In determining the ratio, dimensions of $t$ and R must be equivalent.

For reference, the properties of elastomer and filamentary material and the parameters and spacings as defined above, are listed below.

Filament properties

E—Filament modulus in lbs./sq. in.
D—Average filament diameter, mils.

Elastomer Properties

G—A parameter expressing the stretching modulus of the cured elastomer.
K—A parameter defined by properties of the cured elastomer expressing the degree of shear strain which the elastomer can endure during repeated flexing.
$K_1$ and $K_2$ allowable maximum limits of shear strain.
$k_1$ and $k_2$ calculated existing shear strains during flexing.
$n = k_2/k_1$, when considering existing strains.
$n = K_2/K_1$, when considering critical strains.

Filament spacing $d_1$—Spacing between filaments of a layer.
$d_2$—Spacing between filament layers having parallel filament directions, as defined.
$t$—effective thickness as defined.

Degree of curvature during flexing

R—Change in radius of curvature during flexing.

The inter-relationships between these factors necessary for the practice of this invention cannot be expressed in an algebraic equation which is capable of ready solution. For this reason they are shown in FIGURES 5 and 6.

FIGURE 5 gives the relation between $t/2R$ and $d_1/D$ for several values of $K_1$ plotted on a Log-Log scale.

FIGURE 6 shows the relation between two parameters:

$$\bar{a} = \frac{G}{E} \cdot \frac{D}{d_2}; \text{ and } \bar{c} = \frac{G}{E}\left(1 + \frac{D}{d_1}\right)$$

for different values of $n$, plotted on a Log-Log scale.

EXAMPLE I

The following example demonstrates the usage of FIGURES 5 and 6. A reinforcing element of a pneumatic tire is made from nylon monofilaments having $D=17$ mils and $E=750,000$. Six alternately crossed filament layers are desired, giving a $t$ of about 125 mils and R is about 5.6 inches. The preferred rubber stock has $K=1.58$ and $G=225$ lbs./sq. in. The minimum filament spacings are determined as follows:

(1) Calculate $t/2R$ and from FIGURE 5, at $K=1.58$ read $d_1/D$.
(2) For alternately crossed plies $K=K_1=1.5K_2$; $n=0.67$.
(3) Calculate $\bar{c}$ from $D/d_1$, G, and E. From FIGURE 6, at $n=0.67$ read $\bar{a}$.
(4) From $\bar{a}$, G, and E calculate $D/d_2$.
(5) From $D/d_1$ and $D/d_2$ calculate $d_1$ and $d_2$.

These values for $d_1$ and $d_2$ are minimum values for the stated conditions.

Having described and defined the important factors and the relationships between them necessary for useful flexing life, examples of the construction, properties and flexing resistance of reinforcing elements are given below.

As a means of estimating the resistance to flexing fatigue it is convenient to prepare reinforcing elements in the form of flat sheets and strips cut therefrom. These strips, after curing, are repeatedly flexed on a Scott Flex Tester, model Z, using a pulley diameter of 0.15 to 1.25 inches, tension sufficient to cause close conformance of the sample strip to the pulley surface, and a flexing rate of 250 cycles per minute at room temperatures. Samples are examined at intervals to observe the number of cycles required for the onset of failure and the type of failure. It has been found that structures which endure 100,000 cycles of flexing without failure will usually continue to resist flexing for many more cycles. Other structures usually fail at 60,000 cycles or less, with very few failures between 60,000 and 100,000 cycles. Resistance to 100,000 cycles without damage has therefore been chosen as a criterion for satisfactory and useful service life.

EXAMPLE II

A reinforcing element is made from polyhexamethylene adipamide monofilaments having a diameter of 8 mils and a modulus of 750,000 combined with an elastomer compound of the following composition:

Material, parts by wt.
| | |
|---|---|
| Smoked sheet—rubber (natural) | 90 |
| R Brown-Massed—rubber (natural) | 10 |
| Stearic acid | 1.4 |
| Zinc oxide | 2.8 |
| Carbon black | 25 |
| Stabilite resin [1] | 4 |
| Aminox [2] | 1.54 |
| Accelerator MBT [3] | 0.55 |
| Pine tar | 2.1 |
| Peptizer RPA No. 2 [4] | 0.42 |
| Retarder W [5] | 0.2 |
| Sulfur | 2.87 |

[1] Hydrogenated resin.
[2] Low temperature reaction product of diphenyl amine and acetone.
[3] 2-mercaptonbenzothiazole.
[4] 2-naphthalene thiol.
[5] Salicylic acid.

Test samples of this composition, for the determination of K, are prepared, after thorough mixing, by curing samples of the composition in a mold for 60 minutes at 300° F. The following test results on the cured elastomer composition are obtained.

| | |
|---|---|
| Break elongation, percent | 720 |
| De Mattia flex, hours | 44 |
| Tear, lbs./in. | 220 |

From these values, K of 4.3 is determined for this particular composition. The stretching modulus G is 50 lbs./sq. in.

The monofilaments are coated with an adhesive solution comprising resorcinol-formaldehyde resin and the latex of a terpolymer of butadiene, styrene, and vinyl pyridine sold under the trade name of Gentac. The adhesive is prepared from the following components:

Part I:
| | Parts of weight |
|---|---|
| Water | 238.4 |
| Sodium hydroxide | 0.3 |
| Resorcinol | 11.0 |
| Formaldehyde (37%) | 16.2 |
| Total weight | 265.9 |

Final solution:
| | |
|---|---|
| Water | 61.1 |
| Gentac latex (41% solids) | 244.0 |
| Resin solution from Part I | 265.9 |
| Total weight | 571.0 |

Part I is allowed to stand and react for 6 hours after which the final solution is prepared and allowed to age for four hours before using.

The uncured elastomer compound is formed into a sheet 6 mils in thickness. A building drum four feet in diameter is covered with this sheet stock. A layer of the monofilaments is formed over the stock by helical winding using 58 monofilaments per inch. A similar layer of elastomer sheet stock is placed over the monofilament layer and the assembly is calendered. The combined sheet which is analogous to a ply either for a pneumatic tire or of a conveyor belt is removed from the drum and cut into eight-inch squares. A sandwich is assembled from six of these squares, the filament directions in alternate layers being crossed at 90°. The sandwich is placed in a cavity mold and cured in a press for one hour at 300° F. The elastomer compound completely surrounds each filament and separates the successive layers.

After cooling, the values of $t$ $d_1$ and $d_2$, as defined, are measured after cutting the cured laminate transversely along two intersecting sides to expose the monofilaments. These values are 68.6, 9.3 and 18.3 mils, respectively.

Given the above data for the monofilaments, elastomer compound and for flexing around an 0.75-inch diameter pulley, the minimum values of $d_1$ and $d_2$ are computed from FIGURES 5 and 6 to be 2.14 and 11.36 mils, respectively. A one-inch wide by eight-inch long strip of the reinforcing element is flexed 100,000 times on a Scott Flex Tester, Model Z over an 0.75 inch pulley. No sign of failure is observed.

EXAMPLE III

Two reinforcing elements are made from the adhesive treated nylon monofilaments and the elastomer of Example II as in Example II, except that the filament directions of all layers are parallel, the total thickness $t$ and the spacing between piles being approximately 115 mils and 11 mils, respectively, for each element. In element 1 there are 100 monofilaments per inch and in element 2 there are 58 monofilaments per inch in each layer. In the cured condition (1 hour at 300° F.), the spacing $d_1$ is 2.0 mils and 9.3 mils for elements 1 and 2, respectively. For flexing around an 0.75 inch diameter pulley, the minimum value of $d_1$ as determined from the properties of the materials and FIGURES 5 and 6 is 5.0 mils. A 1 x 8 inch strip of each element is flexed around an 0.75 inch pulley on the Scott Flex Tester. Element 1 having a $d_1$ of only 2.0 mils fails badly by separation between filaments in the layers. Element 2 having $d_1$ of 9.3 mils shows no sign of failure after 100,000 flexes.

EXAMPLE IV

A reinforcing element is made as in Example II using the same adhesive treated nylon monofilaments and elastomer compound except that in this case there is in each layer 100 monofilaments per inch, and less elastomer is placed between plies. In the cured (1 hour at 300° F.) element, the spacings $t$, $d_1$ and $d_2$ are 48.0, 2.0 and 8.0 mils respectively. For flexing around a 1.25 inch diameter pulley, the minimum spacings $d_1$ and $d_2$ required by FIGURES 5 and 6 are 1.2 and 5.9 mils respectively. The sample is flexed 100,000 times around a 1.25 inch diameter pulley on the Scott Flex Tester. No failure is observed.

EXAMPLE V

A reinforcing element is made from polyhexamethylene adipamide monofilaments having a diameter of 8 mils and a modulus of 750,000, and an elastomer compound comprising natural rubber having $K=6.7$ and $G=45$ lbs./square inch. In each layer, there are 100 monofilaments per inch each imbedded in the elastomer compound. Six layers are used and the filament directions of all layers are parallel. In the cured element the spacing $t$, $d_1$, and $d_2$ are 56.4, 2.0, and 3.3 mils respectively. For flexing around an 0.75 inch diameter pulley the minimum spacings permitted from FIGURES 5 and 6 for $d_1$ and $d_2$ are 1.8 mils and 3.0 mils, respectively. The actual spacings were larger. A strip of this six-ply element is cut with the filament direction perpendicular to the axis of bending and flexed over an 0.75 inch diameter pulley on the Scott Flex Tester 100,000 times. No failure is observed.

For this element to flex around an 0.5 inch pulley the minimum spacings permitted by FIGURES 5 and 6 for $d_1$ and $d_2$ are 2.54 and 4.36. The actual spacings are below these minimum values. A strip of this six-ply element is cut with its filament direction perpendicular to the axis of bending and flexed around an 0.5 inch diameter pulley on the Scott Flex Tester. The element failed badly both between layers and between filaments in a layer at about 60,000 flexes.

Two 8.00–15 pneumatic tires, A and B, are made in the following manner. The tire carcass is made by assembling the beads, chafers, and two plies of standard 840 denier two-ply polyhexamethylene adipamide cord fabric in a conventional manner on a standard tire building drum, all the materials having been treated with rubber. The carcass so formed is removed from the building drum, expanded to a shape approximating that of a finished tire, and a sectional wooden form assembled within the carcass to hold the shape. An undertread reinforcement or belt comprising polyhexamethylene adipamide monofilaments as described below, is fabricated in part separately and in part assembled on the carcass, and the sidewall and tread stock rubber is applied while the carcass is on the wooden form. The form is then removed, replaced with a standard curing bag, and the whole tire cured in a pot mold in a conventional manner.

In tire A, the polyhexamethylene adipamide cord fabric of the carcass contains 32 cords per inch of width and the cord ply strips are cut at a bias angle such that the cords on the building drum lie at an angle of 20° to the axis of the drum. A layer of carcass rubber skim stock 60 mils in thickness and somewhat wider than the undertread belt is placed on the expanded carcass between it and the belt. The reinforcement material of the belt is built on a separate drum from polyhexamethylene adipamide monofilaments having a diameter of 17 mils and a modulus of 750,000 pounds per sq. in., and an elastomer stock comprising natural rubber smoked sheets, stearic acid, zinc oxide, HAF carbon black and other minor constituents, the value of K as defined being 1.7 and G being 200 pounds per sq. in. The elastomer stock is calendered to give a sheet of skim stock 16 mils thick. The polyhexamethylene adipamide monofilament is treated with the resorcinol-formaldehyde-latex of Example II and dried.

A sheet of the skim stock is placed on a large cylindrical drum. The polyhexamethylene adipamide monofilament is wrapped spirally on the skim stock sheet and traversed from end to end of the drum to provide 32 ends of monofilament per inch of width. A second layer of 16 mil skim stock is applied over the filament layer. The whole assembly is then calendered.

A first ply of the above reinforcing material 5 inches wide is placed around the circumference of the carcass, the direction of the monofilaments being at 90° to the equatorial plane and the ply strip centered on the carcass. A second ply 5.25 inches wide is placed over the first ply but having its monofilament direction 15° from the equatorial plane. A third ply 5.25 inches wide is placed over the second ply but with its monofilament direction at 15° to the equatorial plane in the opposite sense and at 30° to that of the second ply. A fourth ply 5.5 inches wide is laid over the third ply with its monofilament direction parallel to that of the second ply. A fifth ply 5.75 inches wide is laid over the fourth ply but with its monofilament direction parallel to that of the third ply. Tread and sidewall portions made from stocks used in good quality commercial tires are then applied, the sectional wooden form removed and the tire cured in a pot mold.

Calculating according to FIGURES 5 and 6 from the properties of the materials as give and the radius of curvature expected in the undertread belt from the deflection of the tire in rolling on a smooth road, the minimum allowable values for $d_1$ and $d_2$ are 2.9 mils and 6.4 mils respectively. To allow ample safety factors for impacts and sharp curvatures the actual spacings in the tire are 14.3 mils and 44.4 mils for $d_1$ and $d_2$ respectively.

The tire so made is placed on the front wheel of an automobile, the other front wheel being occupied by a new good quality commercial nylon tire containing polyhexamethylene adipamide cords and having about the same weight of nylon as the test tire. The automobile is run on a figure 8 course designed to test sidewise thrust and tread wear. The test tire loses 1,000 grams of tread during the test. The commercial tire losses 1,700 grams. The test tire is then placed on a road test vehicle and run for an additional 3500 miles. There is no evidence of failure.

In making tire B, the beads, chafers and two plies of 840 denier, two-ply polyhexamethylene adipamide cord fabric are assembled on the conventional building drum as in tire A, except that in tire B the cord plies are cut at such an angle that on the drum the cords form an angle of 4° with the axis of the drum. This carcass is removed from the drum, expanded to the approximate shape of the tire and the sectional wooden mold inserted therein. A six-ply reinforcing undertread belt is formed partly on the tire and partly on a separate drum before application to the tire, from polyhexamethylene adipamide monofilaments of 17 mils diameter having $E=750,000$ lbs./sq. in., and the elastomer stock of Example I having $K=$ to 4.3 and $G=$ to 50 lbs./sq. in. The nylon monofilament is treated with the resorcinol-formaldehyde-latex adhesive of Example II and dried. The skim stock is formed by calendering to a sheet of 18 mils thickness.

To form the first belt ply, a strip of the skim stock approximately the width of the tread is laid around the circumference of the carcas. A layer of the monofilament is formed over this strip by spiral wrapping in a substantially circumferential direction and traversing across the width of the strip to form a layer one monofilament thick having 28 monofilaments per inch of width. A second strip of the skim stock is laid over the layer of monofilaments to complete the first undertread ply. A second undertread ply is then formed over the first in the same manner, consisting of a layer of monofilaments between two layers of skim stock. A similar ply material for use in the third and fourth undertread plies is formed on a large auxiliary drum, again having a single layer of monofilaments, 28 to the inch, between two sheets of 18 mil skim stock. Strips are cut from this material having the filament direction substantially perpendicular to the long direction so that when the strips are laid circumferentially around the tire the filaments are perpendicular to the equatorial plane of the tire. Two such strips are placed successively over the second undertread ply to form the third and fourth undertread plies. The fifth and sixth undertread plies are then formed on the tire in the same manner as the first and second undertread plies, each consisting of a layer of monofilaments, 28 to the inch, extending around the tire in the circumferential direction, sandwiched between two layers of 18 mil skim stock. Each of the undertread plies is approximately the width of the tread. The tread and sidewall rubber is then applied, the sectional wooden form removed and replaced with a curing bag, and the tire cured in a pot mold.

From the expected deflection (24%) of the tire running on a smooth road, the properties of the materials, and FIGURES 5 and 6 the minimum spacings of the monofilaments in the belt, $d_1$ and $d_2$, should be 1.1 mils and 4.9 mils respectively. The actual spacings in the cured tire are 18.7 mils and 42.3 mils respectively. Such spacing allows generous safety factors but provides adequate strength in the belt portion.

The tire is placed on a laboratory test wheel, loaded to cause a deflection of 24% and operated for 3,000 miles. No failure of any kind is observed. This test procedure causes failure in most types of commercial pneumatic tires.

The principles of this invention apply to filamentary materials generally and are not limited to those of any particular composition. Filaments of synthetic linear organic polymers composed of polyamides such as polyhexamethylene adipamide and polycaproamide; polyesters such as polyethylene terephthalate; acrylic polymers such as polyacrylonitrile and copolymers containing at least about 85% by weight acrylonitrile, such as the copolymer of acrylonitrile/methyl acrylate (85/15); polymers or copolymers of vinyl halides or esters such as polyvinyl chloride or polyvinyl acetate; polymers or copolymers of unsaturated hydrocarbons such as polyethylene and polypropylene; regenerated cellulose and viscose rayon may be used. Filaments of inorganic materials such as glass or metals may also be used.

If very fine filaments, for instance below 0.001 inch in diameter, are used a very large number of filaments will be required and great care is required to obtain suitable precision in filament distribution and to prevent breaking of the relatively weak filaments in processing. This requires elaborate handling equipment and, in general, the improvement in performance obtained with very fine filaments does not justify the increased cost. Very large filaments are stiff and, therefore, difficult to process. They also lead to wide filament spacings which may result in defects in the article such as reduced resistance to puncture and reduced ability to hold fasteners, and also cause limitations in design particularly for thin articles. The filament diameter chosen will be governed by the filament properties. For filaments of synthetic linear polymers a range of filament diameter between about .001 inch and about .050 inch may be used, and a range of 0.002 inch to 0.030 inch is preferred.

The curves, FIGURES 5 and 6, have been prepared for filaments having a roughly rounded or oval cross section, that is, for filaments having a ratio of maximum to minimum filament diameter of 3 or less. It will be understood that filaments having other cross-sections such as broad thin ribbons, star, cruciform, Y-shaped and the like, may be used without departing from the spirit of this invention but corrections in detail may be required.

The reinforcing elements made according to this invention and articles incorporating them have many advantages over those of the prior art. Since the filaments are used in the individual form rather than in twisted cords or fabrics a much greater tensile strength and modulus can be achieved with the same weight of filamentary material. Furthermore, the reinforcing material can be arranged in the directions in which reinforcement is desired which is not generally true with fabric reinforcement. By virtue of the high modulus obtainable the reinforcement may be made stiff and highly resistant to distortion, such as stretching and bending. No prior art structures are know which approach the products of this invention in the ability to resist bending and yet to endure repeated cyclic bending for long periods when the required high forces are applied.

A further advantage is realized in service due to the nature and course of ultimate failure. By spacing filamentary structures in an elastomer according to this invention, the structures have a long life which will be greater than that of the elastomer.

This invention is directed to preventing the failure of the composite articles because of flexing, such failure usually occurring within the elastomer or in the elastomer to filament bond. Such structures may also fail within the filaments. This may occur because of degradation due to chemical or thermal effects, or because the filamentary material is inherently too weak or too little of it is used to withstand the tensile loads applied in service. The minimum interfilament spacings of this invention, if followed will result in a stronger structure than those of the prior art. If these spacings are greatly increased the structure could become too weak. It is preferred that on a volume basis the reinforcing element contain at least 5% filamentary material if synthetic polymeric organic filaments are used, and at least 2% if metallic monofilaments are used. As a practical upper limit, the filaments should not be added to the elastomer in an amount that would make proper spacing impossible. The upper limit then, varies with both the particular elastomer and filament diameter chosen. As a preferred embodiment, however, no more than about 80% by volume is added.

This invention also offers important economic advantages. For a required tensile strength, fewer pounds of filamentary material are required. There are also no requirements for the textile operations of twisting, plying, or weaving.

The reinforcing elements for this invention may be used to great advantage in such articles as pneumatic tires, power transmission belts and conveyor belts which endure continual flexing in service.

Among the suitable elastomer compounds for use in the practice of this invention are all natural and synthetic rubber compounds useful for making the above articles, in particular those sold under the trade names of smoked sheet, pale crepe, SBR-1500, GR-S1006, USR No. 400 reclaim and R Brown-Massed. These compounds should contain the desired reinforcing agent, antioxidant, accelerator, plasticizer, activator, peptizer, retarder, and vulcanizer, as conventionaly utilized by rubber compounders.

While preferred embodiments have been disclosed in detail, certain modifications and variations within the spirit of the invention will occur to those skilled in the art. All such modfications and variations are considered to fall within the scope of the following claim.

I claim:

An improved pneumatic tire comprising a reinforced structure especially adapted for prolonged life under conditions of high flexing and distortion, said structure comprising an elastomeric composition, said composition essentially comprised of natural rubber, a plurality of layers of monofilaments of a synthetic polymeric composition, said polymeric composition comprised essentially of polyhexamethylene adipamide, said monofilaments forming a plurality of layers disposed within and completely surrounded by said elastomeric composition; and an adhesive composition for said elastomeric composition completely coating said monofilaments and intimately bonding together said monofilaments and said elastomeric composition; said adhesive composition comprising resorcinol, formaldehyde, and a latex, each component being present in substantial proportions; the monofilaments comprising at least about 5% of the total reinforced structure volume; said elastomeric composition having a stretching parameter (G) in the cured condition between about 40 and about 400 lbs./sq. in.; and being capable of withstanding a degree of shear strain (K) in the cured conditions, during repeated flexing in the range between about 0.5 and about 7.0 K being equal to $$\frac{\sqrt{A \times B \times C}}{606}$$

wherein

A=breaking elongation in percent,
B=the de Mattia Flex in hours, and
C=tear strength in lbs./in.;

the maximum allowable shear strain in the elastomeric composition between the monofilaments of an individual layer being designated by $k_1$; the existing shear strain in service in the elastomeric composition between the layers of monofilaments being designated by $k_2$; $k_1$ being less than $K_1$ and $k_2$ being less than $K_2$, the ratio $n=k_2/k_1$ being about 0.3 and about 3; said monofilaments having a filament stretching modulus (E) of at least about 500,000 lbs./sq. in. and an average filament diameter (D) between about one and about 50 mils; said reinforcing element being capable of withstanding for over 100,000 cycles a change (R) in radius of curvature during flexing of between about 0.20 and about 12 inches, R being derived from the equation $$\frac{1}{R}=\frac{1}{R_1}-\frac{1}{R_0}$$

wherein $R_1$ is the radius of curvature of the reinforcing element in a stressed condition encountered during service and $R^0$ is the radius of curvature of the reinforcing element in an unstressed condition; said reinforcing element also having an effective thickness ($t$) within the range between about 40 and about 1000 mils, ($t$) being the center-to-center distance between the innermost and the outermost of monofilament layers having monofilaments oriented substantially perpendicular to a radius of curvature and an axis of bending encountered during use of the reinforcing element; and, for a given change in radius of curvature R which the reinforcing elements will undergo in service and a given diameter of monofilament, the individual monofilaments of each layer being separated by at least a distance ($d_1$) as derived by reading values of $d_1/D$ from the curves of FIGURE 5 corresponding to values of $t/2R$ and K as determined from given values of $t$, R and K; and computing $d_1$ from $d_1/D$, D being given; the layers of filaments being separated by at least a distance ($d_2$), as derived from the curves of FIGURE 6 by reading the values of $\bar{c}$ corresponding to values of $\bar{a}$ and $n$ as determined from values of G, E, and D and the computed value of $d_1$, and computing ($d_2$) from $\bar{c}$; wherein $$\bar{c}=\frac{G}{E}\left(1+\frac{D}{d_1}\right)$$

$$n=\frac{K_2}{K_1}$$

$$\bar{a}=\frac{G}{E}\frac{D}{d_2}$$

the value of $t/2R$ being between about 0.01 and 0.15.

References Cited by the Examiner
UNITED STATES PATENTS

| | | | |
|---|---|---|---|
| 2,748,049 | 5/1956 | Kalafus | 161—227 |
| 2,858,988 | 11/1958 | Luther | 238—283 |
| 3,024,829 | 3/1962 | Cooper | 152—361 |

ALEXANDER WYMAN, *Primary Examiner.*

M. SUSSMAN, *Assistant Examiner.*